June 21, 1927. D. I. REITER Re. 16,660
FASTENING DEVICE
Original Filed Aug. 16, 1926 2 Sheets-Sheet 1
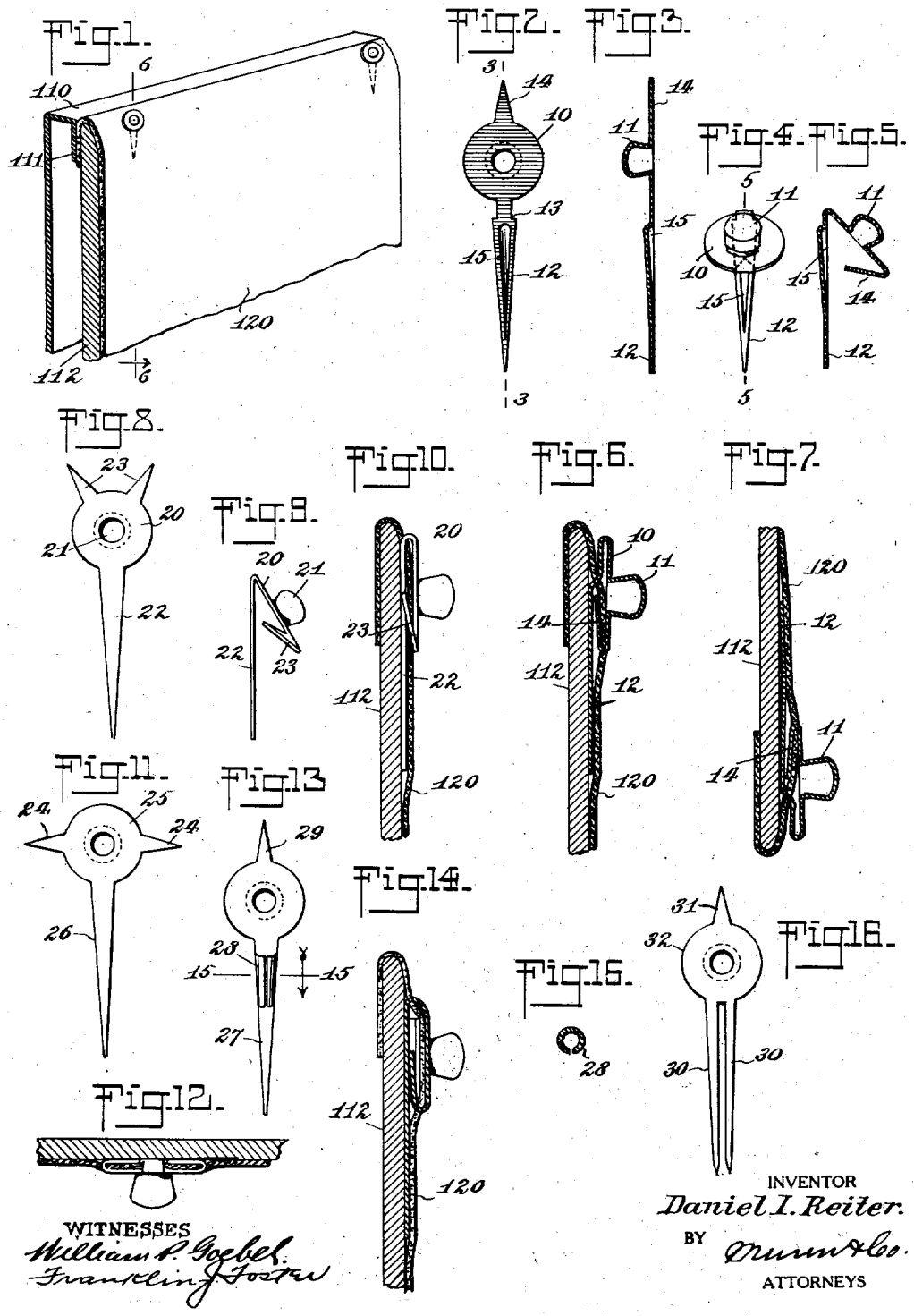
WITNESSES
William P. Goebel.
Franklin J. Foster
INVENTOR
Daniel I. Reiter.
BY Munn & Co.
ATTORNEYS June 21, 1927. D. I. REITER Re. 16,660

FASTENING DEVICE

Original Filed Aug. 16, 1926 2 Sheets-Sheet 2

WITNESSES

William P. Goebel.

Franklin J. Foster

INVENTOR

Daniel I. Reiter.

BY Munn & Co

ATTORNEYS

Reissued June 21, 1927. Re. 16,660

UNITED STATES PATENT OFFICE.

DANIEL I. REITER, OF NEW YORK, N. Y.

FASTENING DEVICE.

Original No. 1,619,764, dated March 1, 1927, Serial No. 129,535, filed August 16, 1926. Application for reissue filed April 29, 1927. Serial No. 187,693.

The present invention is concerned with the provision of a fastening device which may have a wide range of utility in the arts, which is primarily adapted for securing dust covers to the upholstery of automobile seats and backs.

Since the advent of steel body construction in automobile vehicles, it has become common practice to secure the edges of the velour seat coverings between the steel body frame and a plate which is connected to the frame by concealed securing devices. These plates are generally of some hard substance unsuitable for the reception of nails or similar securing devices. In consequence the problem of attaching a dust cover such for instance as an ordinary cretonne cover over the upholstery has become a serious one. The covers themselves are cheap enough, but it is very difficult to find any way of attaching them.

In accordance with the present invention I have provided a fastening device adapted to be attached directly to the velour or to the outer covering of the upholstery, said fastening device carrying one element of a separable fastener, and the other element of the fastener being carried by the dust cover.

Preferably the fasteners which I utilize include pin portions adapted to pass through the velour and lie between the velour and the hard backing plate. Connected to the unpointed ends of the pins are plate portions which overlie the outer surface of the velour and carry either male or female elements of snap fasteners. The plates are also formed with prongs which enter the velour and coact with the pins to prevent twisting or slipping of the fastening devices from proper position.

Objects of the invention are to provide a fastener of the general character outlined above which will be of simple, practical construction, rugged, durable and efficient in use, neat and attractive in appearance and well suited to the requirements of economical manufacture and rapid installation.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a fragmentary sectional perspective view showing a portion of an automobile frame with the velour which forms part of the upholstery attached thereto, and two of my improved fastening devices in applied position.

Fig. 2 is a rear face view of one of the fastening devices.

Fig. 3 is a longitudinal sectional view on the line 3—3 of Fig. 2.

Fig. 4 is a perspective view showing the fastening device partially bent preparatory to inserting into the velour.

Fig. 5 is a vertical sectional view on the line 5—5 of Fig. 4.

Fig. 6 is a vertical sectional view showing the fastener in applied position at the upper end of the velour or upholstery cover.

Fig. 7 is a similar view, but showing the position of the fastener as applied to the bottom of the velour.

Fig. 8 is a rear face view of a modified type of fastener element.

Fig. 9 is an edge view showing the fastening element of Fig. 8 partially bent preparatory to entering it into the fabric.

Fig. 10 is a sectional view showing the fastener attached.

Fig. 11 is a rear face view of a further modified type of fastener.

Fig. 12 is a transverse sectional view showing the fastener of Fig. 11 applied.

Fig. 13 is a rear face view illustrating still another type of fastener.

Fig. 14 is a longitudinal sectional view showing the fastener of Fig. 13 in applied position.

Fig. 15 is a transverse sectional detail on the line 15—15 of Fig. 13.

Fig. 16 is a rear face view of another type of fastener.

Figure 17:
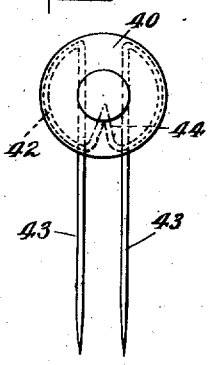
Fig. 17 is a front face view of a further modified type of fastener.

In the drawings I have used the reference character 110 to designate a part of the steel frame construction of an automobile body. The upper edge 111 of a piece of velour 120 or similar upholstering material is clamped between the frame 110 and a relatively stiff frame member 112. Member 112 and frame 110 are preferably connected by concealed fastening means (not shown). The construction as thus far described is entirely conventional, and the fastener of the present invention finds one of its preferred fields of utility as a means for effecting the attachment of a removable dust cover (not shown) to the upholstery of an automobile. The type of fastener shown in Figs. 1 to 7 inclusive includes a flat plate 10 from the center of which is pressed a stud 11. A spear-like pin 12 forms a continuation of one edge of the plate and is shouldered at 13 to prevent withdrawing it from the fabric after it has been entered therethrough. At a point diametrically opposite the spear 12, a spur 14 projects radially from the plate 10. The central portion of the spear 12 is grooved or channelled at 15 defining an anvil portion which consists in bending under and upstanding the prong 14 as the fastener is bent into applied position.

Either subsequently to, or before the spear 12 is entered through the fabric 120, so that it will lie between the fabric 120 and the plate 112, the plate portion 10 is bent over on the spear 12 as illustrated in Figs. 4 and 5, and the prong 14 is bent inwardly under the plate 10. As this bending operation is completed, the prong 14 enters the bending channel or anvil portion of the spear, and is directed inwardly under the plate, it being understood that the prong pierces the velour, and that the spear lies behind the velour. The spear 12 being backed against the plate 112 offers a firm surface which causes further bending of the prong 14 as the fastener is applied. With the fastener in position as shown in Fig. 6 or in Fig. 7, the device will be securely retained against accidental removal and against twisting or slipping. Due to the fact that the spear and the prong enter the fabric at spaced points, they limit lateral shifting movement of the plate and the stop member 11 which it carries in any direction. The spear being backed directly against the plate 112, and the plate 10 being pressed down substantially flat against the spear insures against any material rocking of the plate about the spear as a center.

In the form of fastening device shown in Figs. 8 to 10, the plate portion 20 carries a stud 21 and is integrally connected to a spear 22. A pair of diverging prongs 23 integrally connected with the opposite edge of the plate 20 are adapted to be bent by the plate 112 as the plate 20 is bent into the position of Fig. 10. Prongs 23 will enter the fabric at opposite sides of the spear 22 and will be bent upwardly under the plate, prongs and spear cooperatively preventing slipping or twisting of the fastener when applied.

In Fig. 11 the prongs 24 are disposed at diametrically opposite points on the plate 25 and at right angles to the spear 26. These prongs are bent inwardly toward each other and as the securing device is forced home, the prongs will be bent inwardly and lie behind the spear as seen in the sectional view Fig. 12.

With the form of the device shown in Figs. 13 to 15, spear 27 is formed with flanges 28 rolled inwardly to define a sleeve-like portion. The prong 29 is arranged as in Fig. 1, and when the fastener is applied the prong will be bent inwardly and upwardly, entering the sleeve 28 as shown in Fig. 14. This form of the invention is probably the preferred one.

In Fig. 16, instead of using a single spear, I use a bifurcated or divided spear consisting of a pair of spear-like arms 30. A prong 31 integral with the plate 32 at a point opposite the arms 30, is bent between the arms as the fastener is applied.

Figure 18:
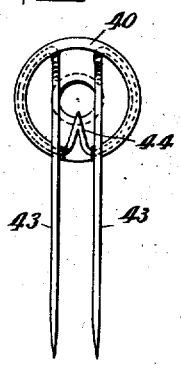
Fig. 18 is a reverse view of the fastener of Fig. 17.
Figure 19:
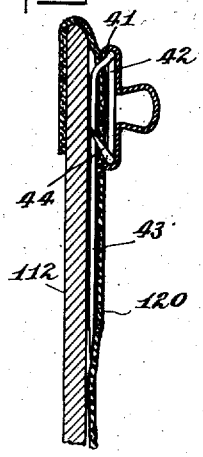
Fig. 19 is a sectional view showing the fastener of Figs. 17 and 18 in place.
Figure 20:
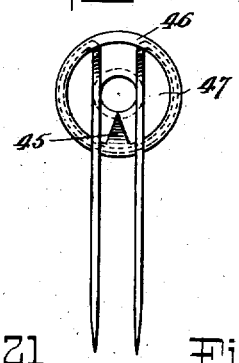
Fig. 20 is a rear face view of a further modified type of fastener.
Figure 21:
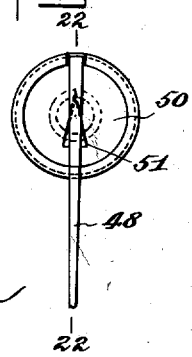
Fig. 21 is a rear face view illustrating still another modification.
Figure 22:
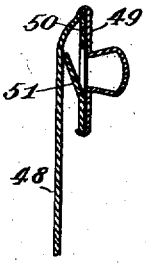
Fig. 22 is a longitudinal sectional view on the line 22—22 of Fig. 21.

In the form of fasteners shown in Figs. 17 to 19 inclusive, plate 40 is in the nature of a button, being flanged at 41 to embrace an approximately circular length of wire 42. The ends of this wire extend radially from the plate 43 and are pointed to enter the fabric. The intermediate portion of the wire defines a prong 44 adapted to enter the fabric, and extend between the pins 43 when the device is applied, as best seen in Fig. 19. In Fig. 20 I have eliminated the prong 44 which forms part of the wire, and have substituted instead a prong 45 struck from the flange 46 of the plate 47. In Fig. 21 a spear 48 is integral with one edge of the plate 49, said plate being flanged for the reception of a disc 50 having a prong 51 struck rearwardly therefrom.

It is to be understood that while I have shown all of the fastening devices as embodying the stud element of a snap fastener, they might equally well carry the socket element; it merely being essential that one element of the separable fastener be attached to the velour and the other carried by the dust cover.

It will also be apparent that while the fastening device of the present invention is particularly suitable for the use indicated, it may have a wide and varied range of usefulness in the arts.

Various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. A fastening device of the class described including a pin portion adapted to penetrate and lie behind a piece of fabric to which the fastener is to be attached, a plate portion connected to the unpointed end of the pin and a separable fastener element carried by the plate portion, said plate portion adapted to overlie the outer face of the fabric, and a spur element associated with the plate portion for penetrating the fabric and coacting with the pin to prevent twisting or slipping of the plate, said spear and spur being integrally connected to the plate at diametrically opposed points and the spear being formed with a channelled portion to guide the bending of the spur.

2. A fastening device of the class described including a spear adapted to penetrate and lie behind a piece of fabric to which the fastener is to be attached, a plate integrally bendably connected to the unpointed end of the spear and a separable fastener element formed integral with the intermediate portion of the plate, the plate adapted to overlie the outer face of the fabric in substantial parallelism with the spear, and a spur integrally connected to the edge of the plate at a point remote from the spear, said spur adapted to penetrate the fabric as the plate is bent into parallelism with the spear after the insertion of the latter, and to prevent accidental retraction of the spear.

3. A fastening device of the class described including a spear adapted to penetrate and lie behind a piece of fabric to which the fastener is to be attached, a plate integrally bendably connected to the unpointed end of the spear and a separable fastener element formed integral with the intermediate portion of the plate, the plate adapted to overlie the outer face of the fabric in substantial parallelism with the spear, and a spur integrally connected to the edge of the plate at a point remote from the spear, said spur adapted to penetrate the fabric as the plate is bent into parallelism with the spear after the insertion of the latter, and to prevent accidental retraction of the spear, said spear including means for guiding the bending movement of the spur, as the plate is folded into parallelism with the spear.

4. A fastening device of the class described including a spear adapted to penetrate and lie behind a piece of fabric to which the fastener is to be attached, a plate integrally bendably connected to the unpointed end of the spear and a separable fastener element formed integral with the intermediate portion of the plate, the plate adapted to overlie the outer face of the fabric in substantial parallelism with the spear, and a spur integrally connected to the edge of the plate at a point remote from the spear, said spur adapted to penetrate the fabric as the plate is bent into parallelism with the spear after the insertion of the latter, and to prevent accidental retraction of the spear, said spear and spur mechanically coacting to prevent twisting movement of the spear.

5. A fastening device of the class described including a spear portion adapted to penetrate and lie behind a piece of fabric to which the fastener is to be attached, a plate portion connected to the unpointed end of the spear, and a separable fastener element carried by the plate portion, said plate portion adapted to overlie the outer face of the fabric, and a spur element associated with the plate portion for penetrating the fabric and coacting with the spear to prevent twisting or slipping of the plate, said spear serving as an anvil to guide the bending of the spur.

6. A fastening device of the class described including a spear portion adapted to penetrate and lie behind a piece of fabric to which the fastener is to be attached, a plate portion connected to the unpointed end of the spear, and a separable fastener element carried by the plate portion, said plate portion adapted to overlie the outer face of the fabric, and a spur element associated with the plate portion for penetrating the fabric and coacting with the spear to prevent twisting or slipping of the plate, said spear being shaped to predetermine the direction of bending of the spur.

7. A fastening device of the class described including a spear portion adapted to penetrate and lie behind a piece of fabric to which the fastener is to be attached, a plate portion connected to the unpointed end of the spear, and a separable fastener element carried by the plate portion, said plate portion adapted to overlie the outer face of the fabric, and a spur element associated with the plate portion for penetrating the fabric and coacting with the spear to prevent twisting or slipping of the plate, said spear and spur being integrally connected to the plate at spaced points, and the spear being formed with a portion to guide the bending of the spur.

8. A fastening device of the class described including a spear adapted to penetrate and lie behind a piece of fabric to which the fastener is to be attached, a plate connected to the spear, and a separable fastener element carried by the plate, the plate adapted to overlie the outer face of the fabric in substantial parallelism with the spear, and a spur connected to the plate at a point remote from the spear, said spur adapted to penetrate the fabric and to prevent accidental retraction of the spear, said spear and spur mechanically coacting to prevent twisting movement of the spear.

DANIEL I. REITER.